(12) United States Patent
Barasa et al.

(10) Patent No.: US 8,820,051 B2
(45) Date of Patent: Sep. 2, 2014

(54) VEHICLE OXIDATION CATALYST EFFICIENCY MODEL FOR ADAPTIVE CONTROL AND DIAGNOSTICS

(75) Inventors: Patrick Barasa, Ann Arbor, MI (US); Scot A. Douglas, Howell, MI (US); Jason D. Mullins, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 916 days.

(21) Appl. No.: 12/853,480

(22) Filed: Aug. 10, 2010

(65) Prior Publication Data

US 2012/0036839 A1 Feb. 16, 2012

(51) Int. Cl.
*F01N 3/035* (2006.01)
*F01N 3/10* (2006.01)
*F01N 3/20* (2006.01)
*F01N 3/025* (2006.01)
*F01N 9/00* (2006.01)
*F01N 13/02* (2010.01)

(52) U.S. Cl.
CPC ........... *F01N 3/0253* (2013.01); *F01N 2610/03* (2013.01); *F01N 3/103* (2013.01); *F01N 3/2066* (2013.01); *Y02T 10/47* (2013.01); *F01N 2560/14* (2013.01); *Y02T 10/24* (2013.01); *F01N 13/02* (2013.01); *F01N 2560/06* (2013.01); *F01N 9/005* (2013.01); *F01N 2250/02* (2013.01); *F01N 9/002* (2013.01)
USPC ................... 60/286; 60/274; 60/295; 60/297; 60/300; 60/303; 60/311; 60/320

(58) Field of Classification Search
USPC ........... 60/274, 276, 282, 286, 295, 297, 299, 60/300, 303, 311, 320
See application file for complete search history.

(56) References Cited

U.S. PATENT DOCUMENTS

| | | | |
|---|---|---|---|
| 6,269,633 B1 * | 8/2001 | van Nieuwstadt et al. ...... | 60/277 |
| 7,299,626 B2 | 11/2007 | Barasa et al. | |
| 8,490,388 B2 * | 7/2013 | Parmentier et al. ............. | 60/286 |
| 2007/0056264 A1 * | 3/2007 | Hou et al. ........................ | 60/274 |
| 2008/0040014 A1 * | 2/2008 | Yahata et al. ................... | 701/99 |
| 2009/0165444 A1 * | 7/2009 | Oosumi .......................... | 60/286 |
| 2010/0037596 A1 * | 2/2010 | Toshioka et al. ................ | 60/286 |
| 2010/0050609 A1 * | 3/2010 | Parmentier et al. ............. | 60/286 |
| 2010/0076666 A1 | 3/2010 | Yanakiev et al. | |
| 2010/0083639 A1 * | 4/2010 | Mullins et al. .................. | 60/285 |

* cited by examiner

*Primary Examiner* — Thomas Denion
*Assistant Examiner* — Jorge Leon, Jr.
(74) *Attorney, Agent, or Firm* — Quinn Law Group, PLLC

(57) ABSTRACT

A vehicle includes a fuel tank, an internal combustion engine, an oxidation catalyst, a regenerable particulate filter in fluid communication with an outlet side of the oxidation catalyst, and a host machine. The host machine calculates an actual hydrocarbon level in the exhaust stream downstream of the particulate filter as a function of an actual energy input value and an actual output value of the oxidation catalyst, and subsequently executes a control action using the actual hydrocarbon level. A method for use aboard the vehicle includes using the host machine to calculate an actual hydrocarbon level in the exhaust stream downstream of the particulate filter, including solving a function of an actual energy input value and an actual energy output value of the oxidation catalyst, and executing a control action aboard the vehicle via the host machine using the actual hydrocarbon level.

15 Claims, 1 Drawing Sheet

VEHICLE OXIDATION CATALYST EFFICIENCY MODEL FOR ADAPTIVE CONTROL AND DIAGNOSTICS

TECHNICAL FIELD

The present invention relates to oxidation catalyst systems of the type used aboard a vehicle.

BACKGROUND

Particulate filters capture and retain microscopic particles of soot, ash, metal, and other suspended matter generated during a fuel combustion process in a vehicle. However, over time the particulate matter accumulates within the filter media, which gradually increases the differential pressure across the filter. In order to extend the life of the filter and optimize engine functionality, some particulate filters can be regenerated using heat, which may be temporarily elevated to 450 degrees Celsius or higher via an injection of fuel into the exhaust stream upstream of the filter. The spike in heat is used in conjunction with a suitable catalyst, e.g., palladium or platinum, wherein the catalyst breaks down accumulated and suspended matter into relatively inert byproducts via a simple exothermic oxidation process.

SUMMARY

A vehicle as disclosed herein includes an internal combustion engine having an exhaust port, an oxidation catalyst in fluid communication with the engine via the exhaust port, a particulate filter, and a host machine. The oxidation catalyst receives an exhaust stream from the exhaust port. The particulate filter is in fluid communication with an outlet side of the oxidation catalyst, and is selectively regenerable using heat from the oxidation catalyst. The host machine calculates an actual hydrocarbon level in the exhaust stream downstream of the particulate filter as a function of an actual energy input and output value of the oxidation catalyst, and then executes a control action determined using the actual hydrocarbon level.

A fuel injection device may be used to selectively inject fuel into the oxidation catalyst, wherein the control action includes initiating feedback control over an operation of the fuel injection device. The host machine may use a temperature model to determine the specific heat value, and temperature signals from various temperature sensors to determine the temperature of the exhaust gas at various locations within the vehicle. The host machine compares the actual energy conversion efficiency to a calibrated threshold, and may generate a diagnostic code as at least part of the control action, with the diagnostic code indicating whether the actual energy conversion efficiency exceeds or does not exceed the threshold.

A system is also provided for use aboard the vehicle noted above. The system includes an oxidation catalyst and a particulate filter. The oxidation catalyst is in fluid communication with an exhaust port of the engine, and is adapted for receiving an exhaust stream from the engine via the exhaust port. The particulate filter is in fluid communication with an outlet side of the oxidation catalyst, and is regenerable using heat from the oxidation catalyst. A host machine calculates an actual hydrocarbon level in the exhaust stream downstream of the particulate filter as a function of actual energy input and output values of the oxidation catalyst, and for subsequently executing a control action using the actual hydrocarbon level, e.g., comparing the actual hydrocarbon level to a threshold, and generating a diagnostic code and/or executing closed or open loop control over the oxidation process.

A method is also provided for use aboard the vehicle noted above. The method includes using the host machine to calculate an actual hydrocarbon level in the exhaust stream downstream of the particulate filter, in part by solving a function of an actual energy input and output value of the oxidation catalyst. Additionally, the method includes executing a control action aboard the vehicle via the host machine using the actual hydrocarbon level.

The above features and advantages and other features and advantages of the present invention are readily apparent from the following detailed description of the best modes for carrying out the invention when taken in connection with the accompanying drawings.

DESCRIPTION

Figure 1:
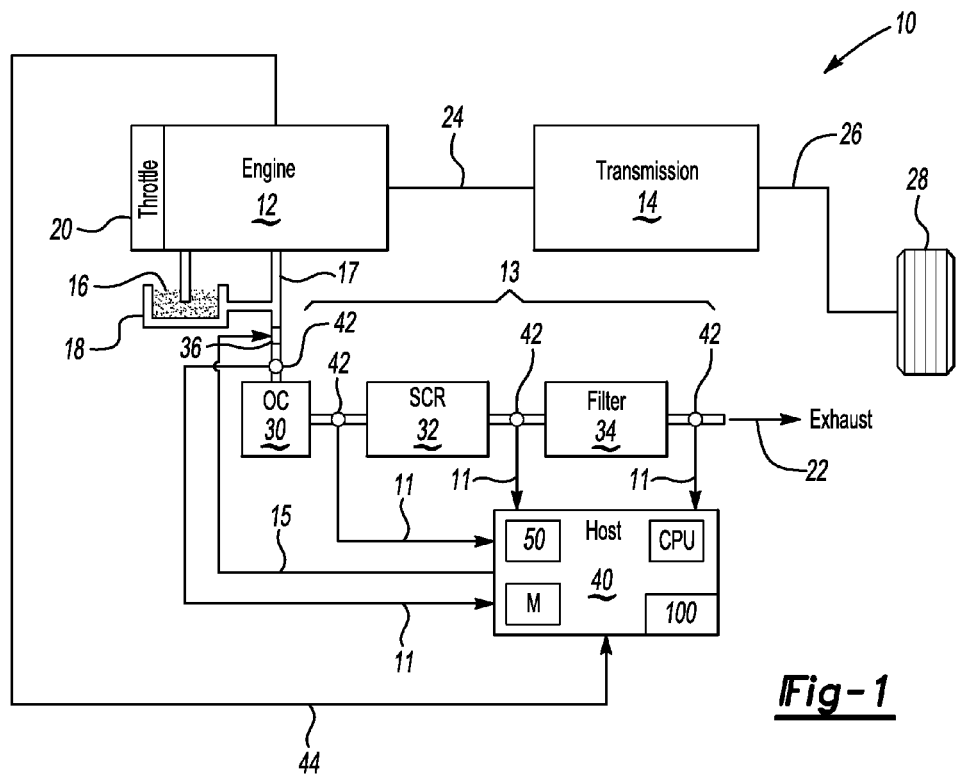
FIG. 1 is a schematic illustration of a vehicle having an internal combustion engine and an oxidation catalyst system.

Referring to the drawings, wherein like reference numbers correspond to like or similar components throughout the several figures, a vehicle 10 is shown schematically in FIG. 1. Vehicle 10 includes a host machine 40 and a diagnostic algorithm 100. Algorithm 100 may be selectively executed by host machine 40 in order to calculate the actual conversion efficiency of an oxidation catalyst (OC) system 13 aboard the vehicle 10. Host machine 40 is thus operable for calculating, evaluating, and controlling actual hydrocarbon levels ultimately discharged from the vehicle 10 into the surrounding atmosphere, doing so in part using a temperature model 50 as described in further detail below with reference to FIG. 2.

Vehicle 10 includes an internal combustion engine 12, such as a diesel engine or a direct injection gasoline engine, the OC system 13, and a transmission 14. Engine 12 combusts fuel 16 drawn from a fuel tank 18. In one possible embodiment, the fuel 16 is diesel fuel, and the oxidation catalyst system 13 is a diesel oxidation catalyst (DOC) system, although other fuel types may be used depending on the design of the engine 12.

A throttle 20 selectively admits a predetermined amount of the fuel 16 and air into the engine 12 as needed. Combustion of fuel 16 generates an exhaust stream 22, which is ultimately discharged from vehicle 10 into the surrounding atmosphere. Energy released by the combustion of fuel 16 produces torque on an input member 24 of the transmission 14. The transmission 14 in turn transfers the torque from engine 12 to an output member 26 in order to propel the vehicle 10 via a set of wheels 28, only one of which is shown in FIG. 1 for simplicity.

OC system 13 is in fluid communication with the exhaust port 17 of engine 12, such that the OC system receives and conditions a fluid in the form of a gaseous exhaust stream 22 as it passes in a gaseous or vapor fluidic state from the exhaust ports 17 of engine 12 through the vehicle's exhaust system. OC system 13 includes an oxidation catalyst 30, an optional selective catalytic reduction (SCR) device 32, and a particulate filter 34. Particulate filter 34 may be configured as ceramic foam, metal mesh, pelletized alumina, or any other temperature and application-suitable material(s).

The term "condition" as employed above refers to temperature control and/or regulation of the exhaust stream 22 at various positions within the OC system 13. To that end, the particulate filter 34 is connected to or formed integrally with the oxidation catalyst 30. A fuel injection device 36 is in electronic communication with host machine 40 via control signals 15, and is in fluid communication with the fuel tank 18. Fuel injection device 36 selectively injects fuel 16 into the oxidation catalyst 30 as determined by the host machine 40. Fuel 16 injected into the oxidation catalyst 30 is burned therein in a controlled manner to generate heat sufficient for regenerating the particulate filter 34.

That is, oxidation catalyst 30 acts in the presence of a controlled temperature of exhaust stream 22 to oxidize or burn any hydrocarbons that are introduced into the exhaust stream. This provides a sufficient temperature level in the particulate filter 34 for oxidizing particulate matter which has been trapped by the filter downstream of the oxidation catalyst 30. The particulate filter 34 is thus kept relatively free of potentially-clogging particulate matter.

Still referring to FIG. 1, in some embodiments an optional selective catalytic reduction (SCR) device 32 may be positioned between the oxidation catalyst 30 and the particulate filter 34. SCR device 32 is a selective catalytic reduction device or unit operable for converting nitrogen oxides (NOx) gasses into water and nitrogen as byproducts using an active catalyst. SCR device 32 may be configured as a ceramic brick or a ceramic honeycomb structure, a plate structure, or any other suitable design.

Vehicle 10 includes the host machine 40, which monitors the ongoing operation of OC system 13 to ensure highly efficient hydrocarbon conversion. Host machine 40 calculates an actual conversion efficiency of the OC system 13, and uses this result to calculate actual hydrocarbon emissions from the OC system. Host machine 40 can then compare the results to a calibrated regulatory or other threshold and execute a control action to reflect the result.

Host machine 40 may be configured as a digital computer acting as a vehicle controller, and/or as a proportional-integral-derivative (PID) controller device having a microprocessor or central processing unit (CPU), read-only memory (ROM), random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Algorithm 100 and any required reference calibrations are stored within or readily accessed by host machine 40 to provide the functions described below with reference to FIG. 2.

Host machine 40 receives temperature signals 11 from various temperature sensors 42 positioned to measure exhaust temperatures at different locations within the OC system 13, including directly downstream of the oxidation catalyst 30 and directly upstream of the particulate filter 34. In one embodiment, a temperature sensor 42 is positioned in proximity to the engine 12 or the inlet side of the oxidation catalyst 30, and adapted to measure or detect an inlet temperature into the oxidation catalyst 30. Additional temperature sensors 42 detect a corresponding outlet temperature from the oxidation catalyst 30, an inlet temperature to the particulate filter 34, and an outlet temperature from the particulate filter 34. These temperature signals 11 are each transmitted by or relayed from the temperature sensors 42 to the host machine 40. Host machine 40 is also in communication with the engine 12 to receive feedback signals 44 that identify the operating point of engine 12, such as the throttle position, engine speed, accelerator pedal position, fueling quantity, requested engine torque, etc.

As will be described immediately below with reference to FIG. 2, the algorithm 100 may be executed by host machine 40 in order to calculate the conversion efficiency of the OC system 13 described above. Host machine 40 uses a temperature model 50 stored in or accessible by host machine 40, and a hydrocarbon injection rate at fuel injector device 36 provides a total energy input, i.e., heat and chemical energy input. By measuring the actual energy output, such as by measuring the heat exiting the DOC combined with information from the temperature model 50, host machine 40 calculates the converted fuel energy, and from this result calculates the amount of unconverted fuel exiting vehicle 10 in the exhaust stream 22. Host machine 40 can then compare the actual hydrocarbon values to a calibrated threshold, e.g., a regulatory standard limit, and can execute a control action suitable to the result.

Figure 2:
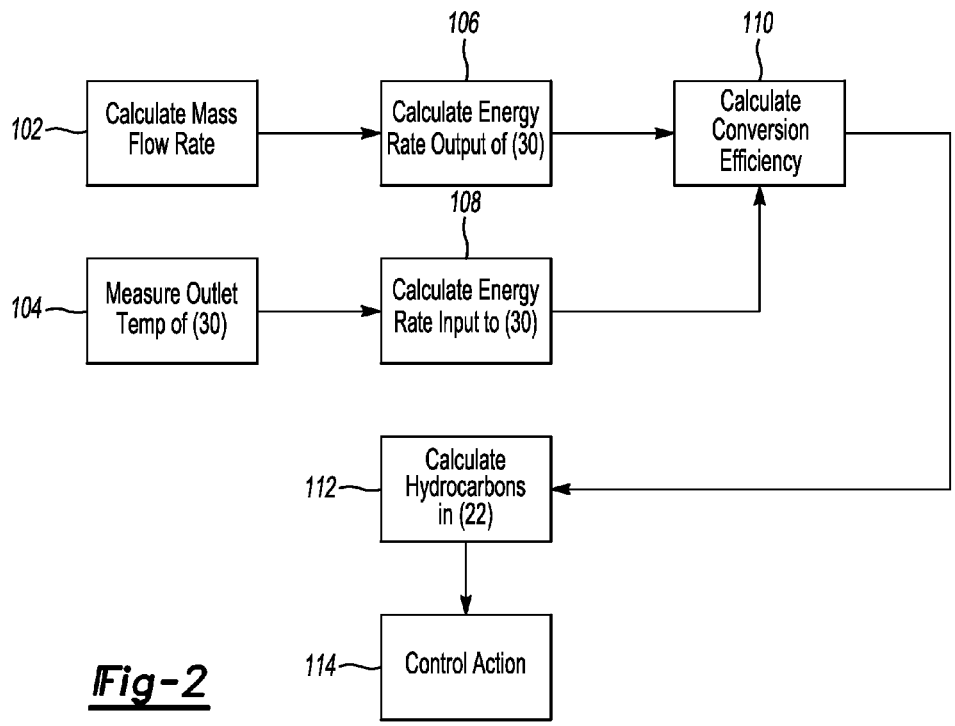
FIG. 2 is a flow chart describing a method for using the oxidation catalyst system shown in FIG. 1.

Referring to FIG. 2, algorithm 100 begins with steps 102 and 104 simultaneously, wherein at step 102 the host machine 40 calculates a mass flow rate, which may be calculated by multiplying the known density ($\rho$) of the vapor comprising the exhaust stream 22, its velocity (V), and the cross-sectional area (A) of flow, or by multiplying the density ($\rho$) by the volume flow rate (Q). At step 104 a temperature sensor 42 measures the outlet temperature of the oxidation catalyst 30 and communicates this value to the host machine 40 as one of the temperature signals 11.

Host machine 40 may retrieve an exhaust specific heat value from the temperature model 50, and may temporarily record this value in memory. At step 104, the flow rate of the fuel 16 is communicated to the host machine 40, e.g., as part of feedback signals 44. The known energy content of this fuel 16 is determined, such as by accessing temperature model 50 or a lookup table. Once all of the required values are determined in steps 102 and 104, the algorithm 100 proceeds to steps 106 and 108.

At step 106, the values determined at step 102 are used by the host machine 40 to calculate the energy rate output from the oxidation catalyst 30. This value is integrated with respect to time, and the value stored in memory. The algorithm 100 then proceeds to step 110.

At step 108, the values determined at step 104 are used by the host machine 40 to calculate the energy rate input into the oxidation catalyst 30. This value is integrated with respect to time, as with step 106 above, and the value stored in memory. The algorithm 100 then proceeds to step 110.

At step 110, the values from steps 106 and 108 are used by host machine 40 to calculate the overall conversion efficiency of the oxidation catalyst 30. The calculated efficiency is then stored in memory for use at step 112. Algorithm 100 then proceeds to step 112.

At step 112, the host machine 40 uses the actual efficiency determined at step 110 to calculate the actual levels of hydrocarbons in the exhaust stream 22. That is, the host machine 40 executes steps 102-110 to determine the actual efficiency value, which can be used to calculate the unconverted energy. Knowing the energy content on the input side to the oxidation catalyst 30, the mass outlet of hydrocarbons contained in the exhaust stream 22 is readily calculated. The algorithm 100 then proceeds to step 114.

At step 114, an appropriate control action is taken by the host machine in response to any of the values calculated in steps 102-112. For example, the actual levels of hydrocarbons calculated at step 112 may be compared to a calibrated design threshold. When hydrocarbon levels are relatively high with respect to the threshold, a corrective action may be taken.

In one embodiment, the control action may be initiation of feedback control over the rate of hydrocarbon injection into the oxidation catalyst 30, and thus of the temperature generated in the subsequent burn of the fuel therein, via control signals 15 communicated by the host machine 40 to the fuel injection device 36 shown in FIG. 1. Other control actions may include recording of a pass/fail diagnostic code, activation of an indicator lamp (not shown), or generation of a message, or any other action conveying the need for replacement or repair of the oxidation catalyst 30 and/or maintenance of and/or control modification to the OC system 13.

Accordingly, the host machine 40 calculates the actual conversion efficiency of the OC system 13 using the heat and chemical energy rates being input into the oxidation catalyst 30, and by comparing the expected exhaust heat energy increase, e.g., as calculated using temperature model 50, to the exiting heat energy content. The ratio of actual energy input to actual energy output determines the efficiency, and this value can be used to trigger one or more control actions as set forth above.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an internal combustion engine having an exhaust port;
an oxidation catalyst in fluid communication with the engine via the exhaust port, wherein the oxidation catalyst receives an exhaust stream from the engine via the exhaust port;
a fuel injection device operable to selectively inject fuel into the oxidation catalyst at an injection rate;
a particulate filter in fluid communication with an outlet side of the oxidation catalyst, wherein the particulate filter is regenerable using heat from the oxidation catalyst; and
a host machine having a central processing unit (CPU), wherein the host machine is a controller of the vehicle that is configured, via the CPU, to:
calculate a mass flow rate of the exhaust stream out of the oxidation catalyst as a function of a density, a velocity, and a cross-sectional area of flow of the exhaust stream;
receive a measured outlet temperature of the oxidation catalyst from a temperature sensor positioned at an outlet of the oxidation catalyst;
determine an actual total energy input value into the oxidation catalyst using the injection rate and an energy content of the fuel;
determine an actual total energy output value from the oxidation catalyst using the calculated mass flow rate, the measured outlet temperature, and a specific heat value of the exhaust stream;
calculate an actual conversion efficiency of the oxidation catalyst using the actual energy input value and the actual energy output value;
calculate an actual hydrocarbon level in the exhaust stream downstream of the particulate filter as a function of the calculated actual conversion efficiency; and
execute a control action with respect to the vehicle when the calculated actual hydrocarbon level exceeds a calibrated threshold.

2. The vehicle of claim 1, wherein the host machine uses a temperature model to determine the specific heat value.

3. The vehicle of claim 1, wherein the control action including initiating feedback control over an operation of the fuel injection device.

4. The vehicle of claim 1, further comprising a plurality of temperature sensors for measuring the temperature of the exhaust stream at various locations within the vehicle, wherein the host machine uses temperature values from the plurality of temperature sensors to calculate the actual energy input value and the actual energy output value, and wherein the temperature sensor is one of the plurality of temperature sensors.

5. The vehicle of claim 1, wherein the host machine generates a diagnostic code as at least part of the control action, with a value of the diagnostic code corresponding to a value of the actual energy conversion efficiency.

6. The vehicle of claim 1, wherein the engine is a diesel engine.

7. A system for use aboard a vehicle having an internal combustion engine, the system comprising:
an oxidation catalyst in fluid communication with an exhaust port of the engine that receives an exhaust stream from the engine via the exhaust port;
a fuel injection device operable to selectively inject fuel into the oxidation catalyst at an injection rate;
a particulate filter in fluid communication with an outlet side of the oxidation catalyst, wherein the particulate filter is regenerable using heat from the oxidation catalyst; and
a host machine having a central processing unit (CPU), wherein the host machine is a controller of the vehicle that is, configured, via the CPU, to:
calculate a mass flow rate of the exhaust stream out of the oxidation catalyst by multiplying together a density, a velocity, and a cross-sectional area of flow of the exhaust stream;
receive an outlet temperature of the oxidation catalyst from a temperature sensor;
determine an actual total energy input value into the oxidation catalyst using the injection rate and an energy content of the fuel;
determine an actual total energy output value from the oxidation catalyst using the calculated mass flow rate, the measured outlet temperature, and a specific heat value of the exhaust stream;
calculate an actual conversion efficiency of the oxidation catalyst using the actual energy input value and the actual energy output value;
calculate an actual hydrocarbon level in the exhaust stream downstream of the particulate filter as a function of the calculated actual conversion of the oxidation catalyst; and
execute a control action with respect to the vehicle when the calculated actual hydrocarbon level exceeds a calibrated threshold.

8. The system of claim 7, wherein the host machine uses a temperature model to determine the specific heat value.

9. The system of claim 7, wherein the control action includes feedback control over an operation of the fuel injection device.

10. The system of claim 7, further comprising a plurality of temperature sensors operable for measuring the temperature of the exhaust gas at various locations within the vehicle, wherein the host machine uses temperature values from the sensors to calculate the actual energy input value and the actual energy output value, and wherein the temperature sensor is one of the plurality of temperature sensors.

11. The system of claim 7, wherein the host machine is to generate a diagnostic code as at least part of the control action, with a value of the diagnostic code corresponding to a value of the actual energy conversion efficiency.

12. The system of claim 7, wherein the oxidation catalyst is a diesel oxidation catalyst and the internal combustion engine is a diesel engine.

13. A method for use aboard a vehicle having an internal combustion engine and an oxidation catalyst (OC) system in fluid communication with an exhaust port of the engine, the OC system including an oxidation catalyst which receives an exhaust stream from the exhaust port of the engine, a particulate filter which is regenerable using heat from the oxidation catalyst, and a host machine having a central processing unit (CPU), the method comprising:

injecting fuel into the oxidation catalyst at an injection rate via a fuel injection device;

determining an actual total energy input value into the oxidation catalyst using the injection rate and an energy content of the injected fuel;

calculating a mass flow rate of the exhaust stream out of the oxidation catalyst as a function of a density, a velocity, and a cross-sectional area of flow of the exhaust stream;

receiving, via the CPU, an outlet temperature of the oxidation catalyst from a temperature sensor;

determining an actual total energy output value from the oxidation catalyst using the calculated mass flow rate, the measured outlet temperature, and a specific heat value of the exhaust stream;

calculating, via the CPU, an actual conversion efficiency of the oxidation catalyst using the actual total energy input value and the actual total energy output value;

calculating an actual hydrocarbon level in the exhaust stream downstream of the particulate filter as a function of the calculated actual efficiency of the oxidation catalyst; and executing a control action aboard the vehicle via the CPU of the host machine when the calculated actual hydrocarbon level exceeds a calibrated threshold.

14. The method of claim 13, the method further comprising:

initiating feedback control over an operation of the fuel injection device as at least part of the control action.

15. The method of claim 13, further comprising:

using a temperature model to determine the specific heat value.

* * * * *